March 19, 1968 W. E. JEWETT ET AL 3,374,415
TRANSISTOR INVERTER UTILIZING POLARITY
CONTROLLED CURRENT FEEDBACK
Filed Sept. 23, 1965 3 Sheets-Sheet 1

INVENTORS W. E. JEWETT
R. P. O'CONNELL
BY
R. B. Ardis
ATTORNEY

FIG. 2A

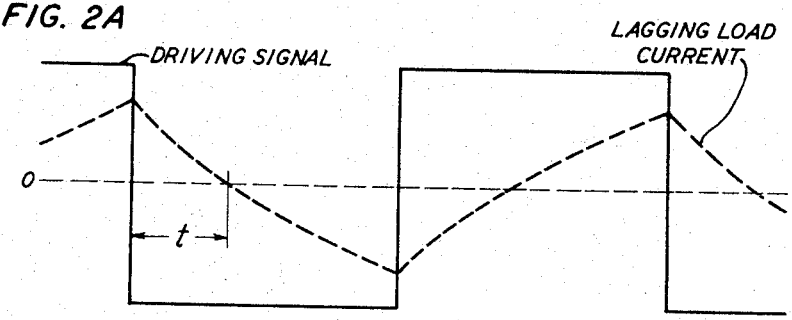

DRIVING SIGNAL
LAGGING LOAD CURRENT

FIG. 2B  FEEDBACK CURRENT IN SECONDARY WINDING 38

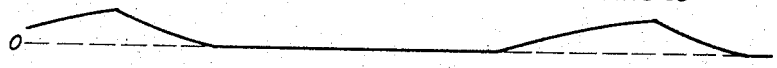

FIG. 2C  FEEDBACK CURRENT IN SECONDARY WINDING 39

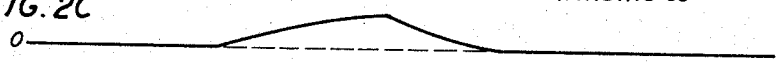

FIG. 2D  DRIVING VOLTAGE IN WINDING 26

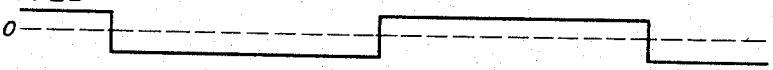

FIG. 2E  DRIVING VOLTAGE IN WINDING 28

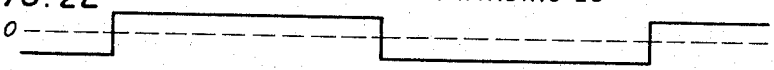

FIG. 2F  COMPOSITE DRIVE CURRENT OF TRANSISTOR 50

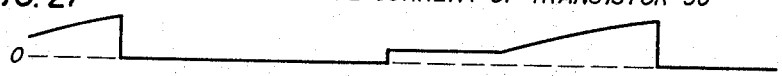

FIG. 2G  COMPOSITE DRIVE CURRENT OF TRANSISTOR 52

FIG. 2H  OPERATING CYCLE TIME SCALE

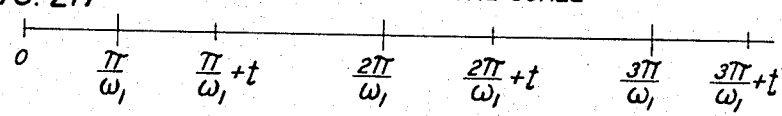

$0 \quad \frac{\pi}{\omega_1} \quad \frac{\pi}{\omega_1}+t \quad \frac{2\pi}{\omega_1} \quad \frac{2\pi}{\omega_1}+t \quad \frac{3\pi}{\omega_1} \quad \frac{3\pi}{\omega_1}+t$

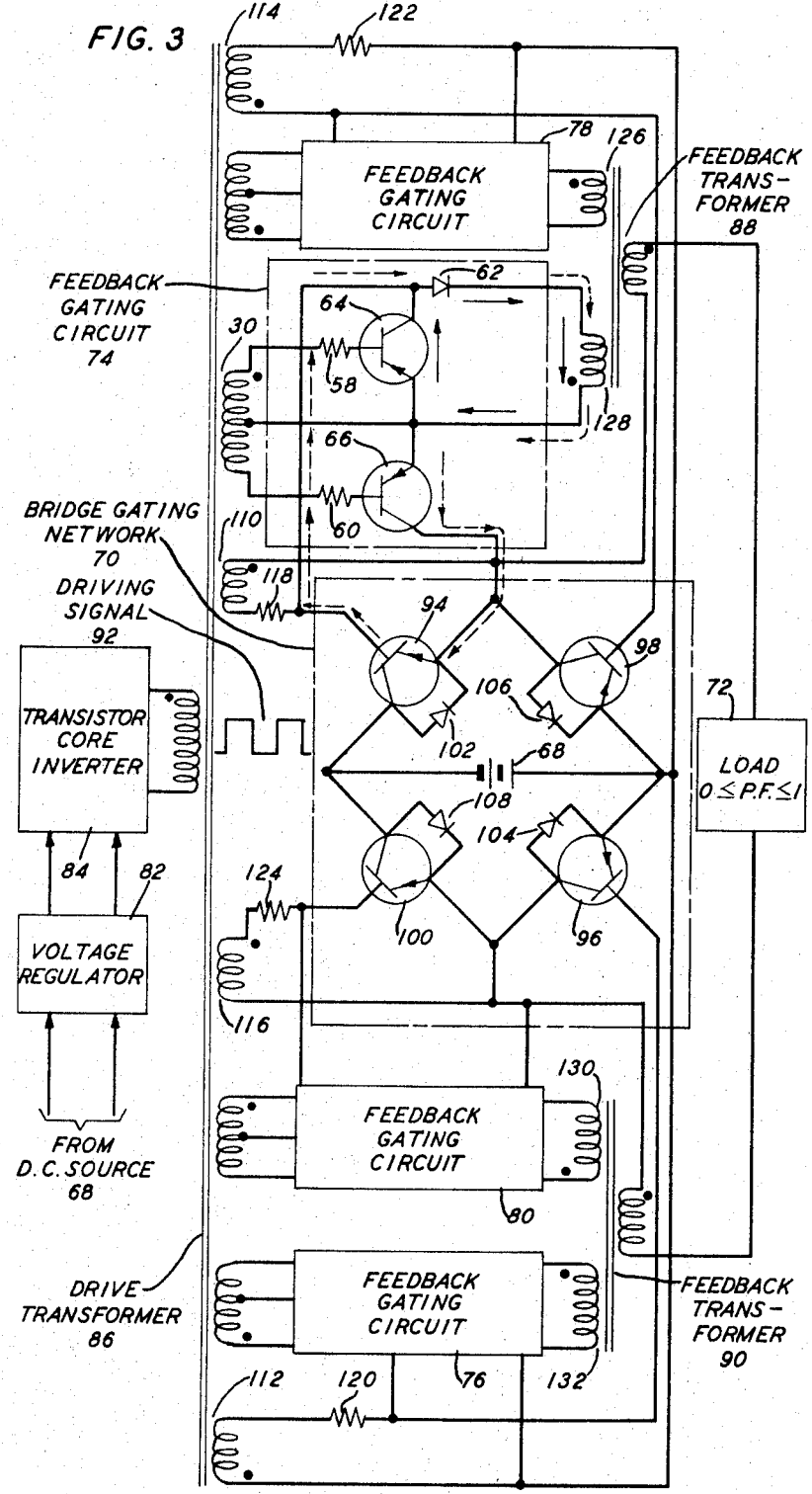

United States Patent Office 3,374,415
Patented Mar. 19, 1968

3,374,415
TRANSISTOR INVERTER UTILIZING POLARITY CONTROLLED CURRENT FEEDBACK
William E. Jewett, Basking Ridge, and Richard P. O'Connell, Ironia, N.J., assignors to Bell Telephone Laboratories, Incorporated, New York, N.Y., a corporation of New York
Filed Sept. 23, 1965, Ser. No. 489,485
4 Claims. (Cl. 321—18)

ABSTRACT OF THE DISCLOSURE

In a driven inverter which utilizes positive current feedback, a feedback gating circuit is associated with each of the switching transistors. The respective feedback gating circuits limit the application of the feedback signal to the switching transistors to that portion of the basic drive signal during which the feedback signal is in phase with the particular drive signal.

This invention relates to driven inverters and, more specifically, to highly efficient transistor inverters capable of supplying power to reactive as well as resistive loads.

In a driven inverter, direct current power is converted to alternating current power by means of a transistor gating network in which a driving signal of predetermined frequency activates gating transistors, allowing current to flow through the load alternatively in opposite directions, thus inverting the direct current to alternating current of a frequency equal to that of the driving signal.

In the application of inverters it is sometimes important that such an inverter be capable of efficiently driving reactive as well as resistive loads. In addition, the alternating current output should be maintained at a constant predetermined frequency. Prior attempts to optimize the combination of these requirements have not been entirely successful.

A primary object of this invention is to render a direct current to alternating current inverter capable of driving reactive as well as resistive loads.

Another object of this invention is to increase the operating efficiency of such an inverter.

An additional object of this invention is to provide for a constant frequency inverter capable of driving loads having a variable power factor.

To fulfill these objects, the invention provides for an inverter having a transistor gating network and incorporating positive current feedback directly proportional to the load current. A frequency stabilized driving signal is utilized to provide for a constant frequency drive of the transistor gating network. In addition, a feedback gating circuit is associated with each of the gating transistors to synchronize the application of the feedback current to the respective gating transistor with the driving signal. This synchronization of the feedback current with the driving signal makes possible a highly efficient operation at constant frequency output, coupled with the capability of driving reactive loads of varying or fixed power factor as well as the capability of driving resistive loads.

More specifically, one embodiment of the invention comprises a typical inverter having a two-transistor gating network, a direct-current source, a stabilized driving signal source, and a feedback gating circuit associated with each of the gating transistors. The basic driving signal is derived from a frequency stabilized inverter in the form of a square wave signal. This stabilized driving signal is applied to the gating transistors to provide for a low power, minimum drive. The frequency of the driving signal governs the gating of the gating transistors, and, consequently, controls the frequency of the alternating-current output of the inverter. The driving signal, in addition, is utilized as the control signal for the feedback gating circuits.

The driving signal activates the inverter gating transistors, allowing current to flow from the source alternately for each half cycle through the series circuit of one-half of the primary of the output transformer, one of the primary windings of the feedback transformer, and one of the gating transistors. The output of the feedback transformer, therefore, represents a signal which is directly proportional to and in phase with the load current of the respective half cycle. However, due to the impedance characteristics of the load, which may be either resistive, inductive, or capacitive, the load current may be out of phase with the load voltage and, consequently, be out of phase with the driving signal. The feedback signal is, therefore, out of phase with the driving signal when the inverter drives a reactive load. For instance, in the case where the load presents an inductive impedance, the load current lags the driving signal. Consequently, as the driving signal reverses polarity it tends to turn off the previously conducting gating transistor and turns on the previously nonconducting gating transistor. The lagging feedback signal, however, prevents the immediate turn-off of the previously conducting transistor. As a result, both gating transistors would be conducting simultaneously, thereby causing the inverter to fail.

The outstanding feature of the present invention, the feedback gating circuits, prevent such failure of the inverter. The feedback gating circuits limit the application of the feedback signal to the gating transistors to those portions of the operating cycle in which the driving signal is of such polarity as to turn on the respective transistor and during which both the driving signal and the feedback signal are of the same polarity. When these conditions are not met, the appropriate feedback gating circuit opens up the feedback path to its respective gating transistor, and the feedback signal is bypassed. The feedback gating circuitry therefore assures that the feedback signal is applied only during the appropriate portion of the gating cycle, thereby effecting the desired feedback even though the load includes a reactive impedance.

A second embodiment extends the invention to a bridge-type direct-current to alternating-current inverter. The operating principles are similar to those of the inverter having a two-transistor gating network. However, in the bridge-type inverter, each leg of the bridge contains at least one gating transistor, each having its own feedback gating circuit. Gating transistors in opposite arms of the bridge function together to alternately cause current to flow in opposite directions through the series combination of the load and two feedback transformers. In order to provide for proper feedback current distribution, two feedback transformers are utilized, where each supplies feedback for gating transistors in two adjacent arms of the bridge.

The above and other features of the invention will be more fully understood from the following detailed description. In the drawings:

FIGS. 2A through 2H show waveforms illustrating the operation of the embodiment of the invention of FIG. 1;

FIG. 3 is a schematic of another specific embodiment of the invention using a bridge-type transistor inverter.

Figure 1:
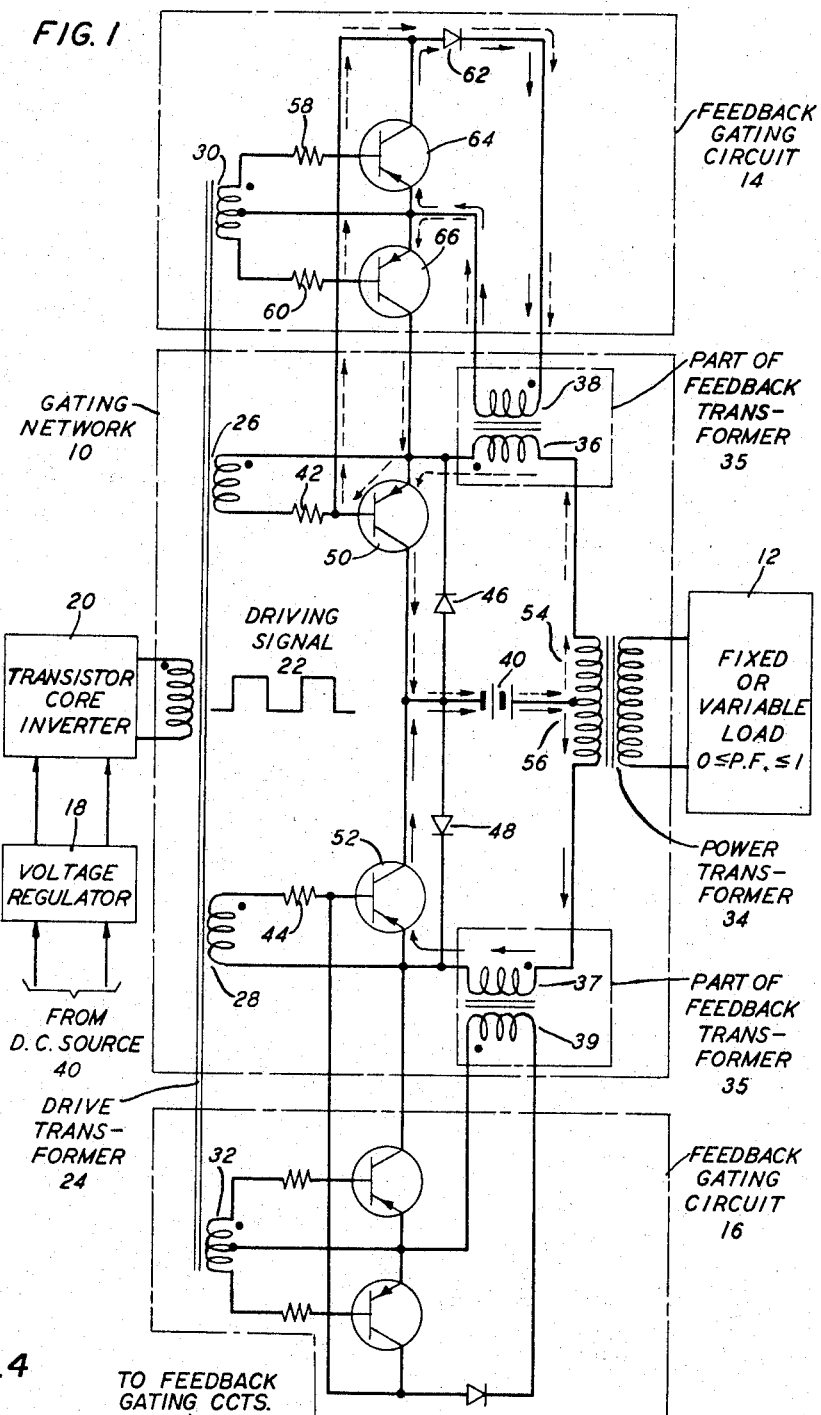
FIG. 1 is a schematic of one specific embodiment of the invention making use of an inverter having a two-transistor gating network.

In FIG. 1 an inverter is shown comprising a two-transistor gating network 10 driving a load 12, feedback gating circuits 14 and 16, and voltage regulator 18 together with transistor-core inverter 20 providing for driving signal 22. Drive transformer 24 is utilized to couple driving signal 22 to gating network 10 as well as to feedback gating circuits 14 and 16 through secondary windings 26, 28, and 30, 32, respectively. Power transformer 34 connects the output of gating network 10 to load 12. Feedback transformer 35, having primary windings 36 and 37, and secondary windings 38 and 39, couples feedback signals proportional to the load current from gating network 10 to feedback gating circuits 14 and 16, respectively.

Square wave driving signal 22 is derived from transistor-core inverter 20 which functions in the manner of a conventional two-core transistor-core inverter (James Lee Jensen, An Improved Square-Wave Oscillator Circuit, IRE Transactions on Circuit Theory, September 1959, page 276). Voltage regulator 18 regulates the direct-current voltage derived from direct-current source 40. The regulated direct-current voltage output of voltage regulator 18 is applied to inverter 20 to assure a constant frequency driving signal, independent of voltage variations of the direct-current source. Voltage regulator 18 may be any one of the voltage regulators familiar to the art. The selection of a particular voltage regulator depends upon the specific regulating characteristics desired. The regulating characteristics in turn determine the frequency stability of inverter 20.

Gating network 10, comprising windings 26 and 28 of drive transformer 24, power transformer 34, feedback transformer 35, direct-current source 40, resistors 42 and 44, diodes 46 and 48, and gating tansistors 50 and 52, functions to invert the direct current supplied by direct-current source 40 to alternating current as furnished to load 12. Transistors 50 and 52 are alternately turned on and off at a rate determined by the frequency of driving signal 22. Windings 26 and 28, coupling a minimum drive signal through current limiting resistors 42 and 44 to the respective base-emitter paths of transistors 50 and 52, are so polarized as to cause one of the transistors to be turned on while the other transistor is turned off. Current flows, therefore, from direct-current source 40 alternately through one path consisting of primary winding section 54 of power transformer 34, primary winding section 36 of feedback transformer 35, and transistor 50 and through another path consisting of primary winding section 56 of power transformer 34, primary winding section 37 of feedback transformer 35, and transistor 52. Consequently, an alternating-current voltage is induced in the secondary winding of power transformer 34 to drive load 12.

In addition to the minimum driving signal coupled from windings 26 and 28, transistors 50 and 52 are supplied with a feedback drive signal derived from feedback transformer 35 and applied through feedback gating circuits 14 and 16, respectively. Feedback gating circuits 14 and 16 perform identical functions each for gating transistors 50 and 52, respectively, during alternate half cycles. The detailed description of the feedback gating circuits is, therefore, restricted to that of feedback gating circuit 14, which comprises winding 30 of drive transformer 24, resistors 58 and 60, diode 62, and transistors 64 and 66. The feedback injut signal for feedback gating circuit 14 is derived from secondary winding section 38 of feedback transformer 35. This feedback signal is directly proportional to, and in phase with, the load current through the primary windings of the feedback transformer. Winding 30 supplies to transistors 64 and 66 through current limiting resistors 58 and 60, respectively, a gating signal which is proportional to driving signal 22. The polarity of the gating signal applied to transistor 64 is opposite in polarity to that applied to transistor 66. However, the gating signal applied to transistor 66 is in phase with the driving signal applied to transistor 50, as may be determined from the polarity markings of the respective transformer windings as indicated in FIG. 1. It is therefore evident that while transistors 50 and 66 are turned on transistor 64 will be turned off, and that while transistors 50 and 66 are turned off, transistor 64 will be turned on. This sequential switching of transistors 64 and 66 allows the application of a feedback signal to transistor 50 to take place only during that portion of the driving signal cycle in which the driving signal tends to turn on transistor 50. The dotted arrows in feedback gating circuit 14 indicate the feedback current path during the transistor 50 on-time, where such path consists of secondary winding section 38 of feedback transformer 35, the emitter-collector path of transistor 66, the emitter-base junction of transistor 50, and diode 62. During the following half cycle, driving signal 22 tends to turn off transistor 50 and turns on transistor 52. However, in case of a reactive load, with the resulting phase difference between load voltage and load current, the feedback signal would also be out of phase with the driving signal, causing both transistors 50 and 52 to be conducting simultaneously. As a result, the inverter would fail by causing either or both of the inverter gating transistors 50 and 52 to burn out.

More specifically, with a load having inductive impedance characteristics, waveforms as depicted in FIGS. 2A through 2F prevail in the circuit of FIG. 1. The relationship of driving signal 22 to a load current lagging a time $t$ is shown in FIG. 2A. The feedback signals induced in secondary winding sections 38 and 39 of feedback transformer 35 are depicted in FIGS. 2B and 2C, respectively, and the basic driving voltages of windings 26 and 28 for transistors 50 and 52 are shown in FIGS. 2D and 2E, respectively. It is evident from FIGS. 2B, 2C, 2D and 2E that the feedback signals of FIGS. 2B and 2C lag the respective driving voltages of FIGS. 2D and 2E. Were these feedback signals directly applied to the gating transistors without any control, the inverter would fail, since both gating transistors 50 and 52 would be turned on together during the feedback signal lag time.

In the instant invention, feedback gating circuits 14 and 16 are utilized to restrict the application of the feedback signal to the proper portion of the operating cycle as previously described. When, during a first half operating cycle the feedback signal of FIG. 2B is in phase with the driving signal of FIG. 2d, transistor 64 is turned off and transistor 66 is turned on, allowing the application of the feedback signal to the emitter-base junction of transistor 50, with the composite drive current of FIG. 2F resulting. At time $\pi/\omega_1$ driving signal 22, FIG. 2A, reverses polarity. Therefore, the driving voltages in winding 26, FIG. 2D, and in winding 30 also reverse polarity. As a result, transistor 66, which has now been turned off, together with transistor 64, which has now been turned on, prevent the further application of the feedback signal to transistor 50, and the driving voltage of winding 26, reversed at that instant, is able to turn off transistor 50. At time $\pi/\omega_1$ the driving voltage in winding 28 also reverses, causing transistor 52 to be turned on, starting the second half cycle of the alternating current output voltage. During the period from $$\frac{\pi}{\omega_1} \text{ to } \frac{\pi}{\omega_1}+t$$

the lagging load current, however, continues to flow forcing a current flow through power transformer primary section 56, direct-current source 40, diode 48, and primary winding section 37 of feedback transformer 35, thereby generating a continuing feedback signal in secondary winding section 38 of feedback transformer 35 as shown in FIG. 2B. In order to prevent during this portion of the operating cycle an excessive impedance reflection into primary winding section 37 of feedback transformer 35, a current path is provided for the feedback signal of secondary winding section 38 through diode 62 and the forward biased transistor 64. During the second half portion of the operating cycle feedback gating circuit 16 performs the identical function for gating transistor 52 as feedback gating circuit 14 performed during the previous half cycle for gating transistor 50. The composite drive current for transistor 52 is shown in FIG. 2G. During this second half cycle diode 62 prevents current flow through secondary winding 38 of the feedback transformer.

Figure 4:
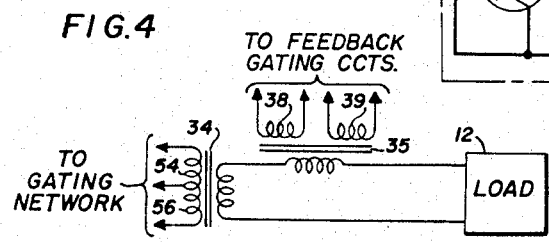
FIG. 4 shows a variation of the output circuit for the embodiment of the invention illustrated in FIG. 1.

In the embodiment of the invention of FIG. 1, feedback transformer 35 may be replaced by a feedback transformer having a single primary winding and two secondary windings, one secondary winding each providing for the feedback signal for one of the feedback gating circuits. The primary windings of the feedback transformer would, however, be connected in series with the secondary winding of power transformer 34 and the load as shown in FIG. 4. In both secondary windings of the feedback transformer bipolar feedback signals would therefore be generated. However, diode 62 would not allow feedback current to flow in gating circuit 14 during the period from $$\frac{\pi}{\omega_1} + t \text{ to } \frac{2\pi}{\omega_1} + t$$

as shown in FIG. 2B. FIG. 2C illustrates the feedback current in the feedback transformer, secondary winding section 39 supplying the feedback signal for gating transistor 52.

Another specific embodiment of the invention, as shown in FIG. 3, comprises a bridge gating network 70 driving a load 72, feedback gating circuits 74, 76, 78 and 80, voltage regulator 82, two-core transistor-core inverter 84, drive transformer 86, and feedback transformers 88 and 90.

Inverter 84 and voltage regulator 82 perform the same functions as the equivalent circuits in the embodiment of FIG. 1, and, therefore, provide for driving signal 92 which is coupled through drive transformer 86 to bridge gating network 70 as well as to the feedback gating circuits.

Bridge gating network 70, comprising transistors 94, 96, 98 and 100, diodes 102, 104, 106 and 108, and direct-current source 68, functions as the basic gating circuit to invert the direct current supplied by direct-current source 68 to alternating current as furnished to load 72. Transistor pairs in opposite arms of the bridge, that is, transistor pairs 94, 96 and 98, 100 are alternately and in phase opposition turned on and off at a rate determined by the frequency of driving signal 92. Secondary windings 110, 112, 114 and 116 of drive transformer 86 couple the minimum drive signal through current limiting resistors 118, 120, 122 and 124 to the base-emitter paths of transistors 94, 96, 98 and 100, respectively, to accomplish the required gating. Current flows, therefore, from direct-current source 68 alternately through one path consisting of the emitter-collector path of transistor 96, the primary winding of feedback transformer 90, load 72, the primary winding of feedback transformer 88, and the emitter-collector path of transistor 94, and another path consisting of the emitter-collector path of transistor 98, the primary winding of feedback transformer 88, the load 72, the primary winding of feedback transformer 90, and the emitter-collector path of transistor 100. Consequently, an alternating current having a frequency equal to that of the driving signal flows through load 72 as well as the primary windings of feedback transformers 88 and 90.

In addition to the minimum drive signal coupled from windings 110, 112, 114 and 116, transistors 94, 96, 98 and 100 are supplied with a feedback drive signal as derived from feedback transformers 88 and 90 and applied through feedback gating circuits 74, 76, 78 and 80, where the feedback gating circuits perform identical functions each for gating transistors 94, 96, 98 and 100. The individual feedback gating circuits of the embodiment of the invention of FIG. 3 perform the identical functions as described in detail for the feedback gating circuit of the embodiment of FIG. 1; that is, the feedback gating circuits allow the application of a feedback signal to the respective gating network transistor only during that portion of the operating cycle in which the respective driving signal tends to turn on the respective transistor and when these driving and feedback voltages are of the same polarity. The components of feedback gating circuit 74 of FIG. 3 have been labeled like those corresponding components of the feedback gating circuit 14 of FIG. 1 to illustrate their identity. Feedback transformers 88 and 90 have each two secondary windings which supply feedback signals for gating transistors in adjacent arms of the bridge; that is, secondary windings 126 and 128 of feedback transformer 88 supply feedback signals for transistors 98 and 94, respectively, whereas secondary windings 130 and 132 of feedback transformer 90 supply feedback signals for transistors 100 and 96, respectively.

During each half cycle, only one of the two secondary windings of each feedback transformer supplies a feedback signal, since only one of the two respective transistors served by the particular feedback transformer is conducting at a time. Diode 62 in conjunction with the feedback transformer secondary winding is so polarized as to allow feedback current flow to take place only during that portion of the operating cycle in which the load current induces a positive feedback signal in the respective feedback transformer secondary winding. In order to assure exact feedback signal distribution during each half-operating cycle, two feedback transformers have been employed in the embodiment of the invention shown in FIG. 3, wherein each feedback transformer supplies a feedback signal to but one gating transistor at a time.

It is therefore apparent that the inverters employing the feedback gating circuits of the present invention are capable of driving fixed or variable reactive loads as well as resistive loads, utilizing current feedback to provide for optimum operating efficiency at a constant frequency alternating current output.

What is claimed is:

1. In an inverter for supplying power to a load which may have a power factor other than unity, four transistors each having an emitter electrode, a collector electrode, and a base electrode, a four-terminal bridge circuit having the emitter-collector path of a respective one of said transistors connected in each of the arms thereof, a source of direct current, means to couple said source between one pair of diagonally opposite terminals of said bridge circuit, means to couple said load between the other pair of diagonally opposite terminals of said bridge circuit, a first and a second positive feedback means serially connected between said load and said other pair of diagonally opposite terminals of said bridge circuit, said first feedback means coupled to the respective emitter-base paths of each of a first pair of transistors in one set of adjacent arms of said bridge, said second feedback means coupled to the respective emitter-base paths of each of a second pair of transistors in another set of adjacent arms of said bridge, said first and second feedback means switching said adjacent transistors into alternate states of high and low conductivity in phase opposition to one another, means to supply a driving signal of constant frequency to the respective emitter-base paths of said transistors to fix the frequency at which said transistors alternate conductivity states, and gating means in each of said feedback paths to each of said transistors to limit the positive feedback to the respective emitter-base paths of said transistors to those portions of the operating cycle in which both said driving signal and the current through said load are of the same polarity.

2. In the inverter according to claim 1 in which said means to supply a driving signal comprises a constant frequency driving signal source, a drive transformer having a primary winding and eight secondary windings, a first set of four of said secondary windings having two end terminals, a second set of four of said second windings having two end terminals and one intermediate terminal located between said end terminals, and said driving signal being coupled into the primary winding of said drive transformer, means to supply said driving signal to the respective emitter-base paths of each of said transistors comprising one of said secondary windings of said first set of secondary windings of said drive transformer, said secondary winding being connected between the base electrode and the emitter electrode of said respective transistor, said bridge circuit comprising four diodes having the anode of a respective one of said diodes connected to the collector electrode of a transistor in each of the arms thereof, and having the cathode of a respective diode connected to the emitter electrode of the respective transistor, said first and second feedback means each comprising a feedback transformer each having a primary winding and two secondary windings, said primary windings being serially connected between said load and said bridge circuit, and said secondary windings serving to couple said feedback transformer output to the respective emitter-base paths of said transistors, said gating means in each of said feedback paths of the respective bridge transistors comprising a first and a second transistor, each having a base electrode, an emitter electrode, and a collector electrode, said emitter electrodes of said first and second transistor being connected to one terminal of one of said feedback transformer secondary windings and said intermediate terminal of one of said second set of secondary windings of said drive transformer, a diode having its cathode connected to another terminal of said feedback transformer secondary winding and its anode connected to said collector electrode of said first transistor and to said base electrode of the respective bridge transistor, said collector electrode of said second transistor being connected to said emitter electrode of said respective bridge transistor, said base electrode of said first transistor being connected to one end terminal, and said base electrode of said second transistor being connected to the other end terminal of said respective secondary winding of said second set of secondary windings of said drive transformer.

3. In an inverter for supplying power to a load which may have a power factor other than unity, a first and a second transistor each having an emitter electrode, a base electrode, and a collector electrode, a direct-current source having two terminals, a power transformer having a primary winding and a secondary winding, said primary winding having two end terminals and an intermediate terminal between such end terminals, means to connect said secondary winding to said load, a feedback transformer having a primary winding and a first and a second secondary winding, means to serially connect said feedback transformer primary winding with said power transformer secondary winding and said load, said emitter electrode of said first transistor being connected to one end terminal of said primary winding of said power transformer, said emitter electrode of said second transistor being connected to the other end terminal of said primary winding of said power transformer, said intermediate terminal of said power transformer primary being connected to one terminal of said direct-current source, said collector electrodes of said transistors being connected to the other terminal of said direct-current source, a first positive feedback path coupled from said first secondary winding of said feedback transformer to the base-emitter path of said first transistor, a second positive feedback path coupled from said second secondary winding of said feedback transformer to the base-emitter path of said second transistor to switch said transistors into alternate states of high and low conductivity in phase opposition to one another, means to supply a driving signal of constant frequency to the respective emitter-base paths of said first and second transistors to fix the frequency at which said first and second transistors alternate conductivity states, and gating means in each of said feedback paths to limit the positive feedback to the respective emitter-base paths of said first and second transistors to those portions of the operating cycle in which both said driving signal and the current through said load are of the same polarity, said means to supply a driving signal comprising a constant frequency driving signal source, a drive transformer having a primary winding and a first, second, third, and fourth secondary winding, said driving signal being coupled into the primary winding of said drive transformer, said first and second of said secondary windings of said drive transformer having two end terminals, said third and fourth of said secondary windings of said drive transformer having two end terminals and one intermediate terminal located between said end terminals, said first secondary winding being connected between said emitter electrode and said base electrode of said first transistor, said second secondary winding being serially connected between said emitter electrode and said base electrode of said second transistor, thereby supplying said driving signal to said first and second transistors, respectively, a first and second diode with their anodes connected to a point common to the collector electrodes of said transistors, said first diode having its cathode connected to the emitter electrode of said first transistor, and said second diode having its cathode connected to the emitter electrode of said second transistor, said gating means in each of said feedback paths comprising a third, fourth, fifth and sixth transistor, each having an emitter electrode, a base electrode, and a collector electrode, said emitter electrodes of said third and fourth transistors being connected to one terminal of said first secondary winding of said feedback transformer and said intermediate terminal of said third secondary winding of said drive transformer, a third and fourth diode, said third diode having its cathode connected to another terminal of said first secondary winding of said feedback transformer and its anode connected to said collector electrode of said fourth transistor and to said base electrode of said first transistor, said collector electrode of said third transistor being connected to a point common to said emitter electrode of said first transistor and the cathode of said first diode, said base electrode of said third transistor being connected to one end terminal of said third secondary winding of said drive transformer, said base electrode of said fourth transistor being connected to the other end terminal of said third secondary winding, said emitter electrodes of said fifth and sixth transistors being connected to one terminal of said second secondary winding of said feedback transformer and said intermediate terminal of said fourth secondary winding of said drive transformer, said fourth diode having its cathode connected to another terminal of said second secondary winding of said feedback transformer, and its anode connected to said collector electrode of said sixth transistor and to said base electrode of said second transistor, said collector electrode of said fifth transistor being connected to a point common to said emitter electrode of said second transistor and said cathode of said second diode, said base electrode of said fifth transistor being connected to one end terminal of said fourth secondary winding of said drive transformer, and said base electrode of said sixth transistor being connected to the other end terminal of said fourth secondary winding of said drive transformer.

4. In an inverter for supplying power to a load which may have a power factor other than unity, a first and a second gating transistor each having an emitter electrode, a base electrode, and a collector electrode, a direct-current source having two terminals, a power transformer having a primary winding and a secondary winding, said primary winding having two end terminals and an intermediate terminal between such end terminals, means to connect said secondary winding to said load, a feedback transformer having a first and a second primary winding and a first and a second respective secondary winding, said first primary winding of said feedback transformer being connected between said emitter electrode of said first transistor and one end terminal of said power transformer primary winding, said second primary winding of said feedback transformer being connected between said emitter electrode of said second transistor and another end terminal of said power transformer primary winding, said collector electrodes of said first and second transistors being connected to one terminal of said direct-current source, said other terminal of said direct-current source being connected to said intermediate terminal of said power transformer primary winding, a first positive feedback path coupled from said first secondary winding of said feedback transformer to the emitter-base path of said first transistor, and a second positive feedback path coupled from said second secondary winding of said feedback transformer to the base-emitter path of said second transistor to switch said transistors into alternate states of high and low conductivity in phase opposition to one another, means to supply a driving signal of constant frequency to the respective emitter-base paths of said first and second transistors to fix the frequency at which said first and second transistors alternate conductivity states, and gating means in each of said feedback paths to limit the positive feedback to the respective emitter-base paths of said first and second transistors to those portions of the operating cycle in which both said driving signal and the current through said load are of the same polarity, said means to supply a driving signal comprising a constant frequency driving signal source, a drive transformer having a primary winding and four secondary windings, said driving signal being coupled into the primary winding of said drive transformer, a first set of two of said secondary windings having two end terminals, a second set of two of said secondary windings having two end terminals and one intermediate terminal located between said end terminals, one of said first set of secondary windings being connected between said emitter electrode and said base electrode of said first transistor, another of said first set of secondary windings being connected between said emitter electrode and said base electrode of said second transistor, thereby supplying said driving signal to said first and second transistors, respectively, a first and second diode with their anodes connected to a point common to the collector electrodes of said first and second transistors, said first diode having its cathode connected to the emitter electrode of said first transistor, and said second diode having its cathode connected to the emitter electrode of said second transistor, said gating means in each of said feedback paths for said first and second gating transistors each comprising a third and fourth transistor, each having an emitter electrode, a base electrode, and a collector electrode, said emitter electrodes of said third and fourth transistors being connected to one terminal of one of said feedback transformer secondary windings and to said intermediate terminal of one of said second set of secondary windings of said drive transformer, a third diode, said third diode having its cathode connected to another terminal of said respective feedback transformer secondary winding and its anode connected to said collector electrode of said fourth transistor and to said base electrode of said respective gating transistor, said collector electrode of said third transistor being connected to said emitter electrode of said respective gating transistor, said end terminals of said respective secondary winding of said second set of secondary windings of said drive transformers being connected to said base electrodes of said third and fourth transistors, respectively.

References Cited

UNITED STATES PATENTS

| | | | |
|---|---|---|---|
| 3,089,077 | 5/1963 | Lee | 321—45 |
| 3,146,406 | 8/1964 | Wilting. | |
| 3,181,085 | 4/1965 | Lloyd. | |
| 3,233,161 | 2/1966 | Sikorra | 321—45 X |
| 3,265,953 | 8/1966 | Wellford | 321—45 |
| 3,317,815 | 5/1967 | Merritt | 321—45 |

JOHN F. COUCH, *Primary Examiner.*

W. SHOOP, *Assistant Examiner.*